(12) United States Patent
Chung et al.

(10) Patent No.: US 10,078,357 B2
(45) Date of Patent: *Sep. 18, 2018

(54) POWER GATING FUNCTIONAL UNITS OF A PROCESSOR

(71) Applicant: Intel Corporation, Santa Clara, CA (US)

(72) Inventors: Jaewoong Chung, Bellevue, WA (US); Hanjun Kim, Princeton, NJ (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 682 days.

This patent is subject to a terminal disclaimer.

(21) Appl. No.: 14/594,465

(22) Filed: Jan. 12, 2015

(65) Prior Publication Data

US 2015/0160715 A1 Jun. 11, 2015

Related U.S. Application Data

(63) Continuation of application No. 13/528,548, filed on Jun. 20, 2012, now Pat. No. 8,954,775.

(51) Int. Cl.
*G06F 9/30* (2018.01)
*G06F 1/32* (2006.01)
*G06F 9/38* (2018.01)

(52) U.S. Cl.
CPC .......... *G06F 1/3234* (2013.01); *G06F 1/3243* (2013.01); *G06F 1/3287* (2013.01); *G06F 9/30* (2013.01); *G06F 9/30083* (2013.01); *G06F 9/3836* (2013.01); *Y02D 10/152* (2018.01); *Y02D 10/171* (2018.01); *Y02D 50/20* (2018.01)

(58) Field of Classification Search
CPC .. G06F 9/30083; G06F 9/5094; G06F 1/3287; G06F 1/3293
See application file for complete search history.

(56) References Cited

U.S. PATENT DOCUMENTS

| | | | |
|---|---|---|---|
| 7,243,213 B2 | 7/2007 | Pagni et al. | |
| 7,428,645 B2 | 9/2008 | O'Connor et al. | |
| 2006/0225046 A1* | 10/2006 | Feekes, Jr. ............ | G06F 1/3203 717/127 |
| 2007/0011474 A1* | 1/2007 | Lee ........................ | G06F 1/3203 713/300 |
| 2011/0296149 A1* | 12/2011 | Carter ................... | G06F 1/3203 712/229 |

OTHER PUBLICATIONS

U.S. Appl. No. 13/247,580, entitled "Controlling Temperature of Multiple Domains of a Multi-Domain Processor," by Avinash Ananthakrishnan, et al., filed Sep. 28, 2011.

(Continued)

*Primary Examiner* — Albert C Wang
(74) *Attorney, Agent, or Firm* — Trop, Pruner & Hu, P.C.

(57) ABSTRACT

In one embodiment, the present invention includes an apparatus having a core including functional units each to execute instructions of a target instruction set architecture (ISA) and a power controller to control a power mode of a first functional unit responsive to a power identification field of a power instruction of a power region of a code block to be executed on the core. Other embodiments are described and claimed.

17 Claims, 8 Drawing Sheets

(56) References Cited

OTHER PUBLICATIONS

International Patent Application No. PCT/US2011/067334, entitled "Methods and Systems to Control Power Gates During an Active State of a Gated Domain Based on Load Conditions of the Gated Domain," by Michael Zelickson, et al, filed Dec. 27, 2011.

International Patent Application No. PCT/US2012/031465, entitled "Controlling Power Gate Circuitry Based on Dynamic Capacitance of a Circuit," by Vjekoslav Svilan, et al., filed Mar. 30, 2012.

International Patent Application No. PCT/US2012/031464, entitled "Dynamically Measuring Power Consumption in a Processor," by Ankush Varma, et al., filed Mar. 30, 2012.

S. Dropsho, et al., "Managing Static Leakage Energy in Microprocessor Functional Units," Nov. 2002, 12 pages.

Z. Hu, et al., "Microarchitectural Techniques for Power Gating of Execution Units," 2004, 6 pages.

S. Rele, et al., "Optimizing Static Power Dissipation by Functional Units in Superscalar Processors," 2002, 16 pages.

W. Zhang, et al., "Compiler Support for Reducing Leakage Energy Consumption," 2003, 12 pages.

U.S. Appl. No. 13/326,586, entitled "User Level Control of Power Management Policies," by Krishnakanth V. Sistla, et al., filed Dec. 15, 2011.

U.S. Appl. No. 13/326,605, entitled "Dynamically Modifying a Power/Performance Tradeoff Based on Processor Utilization," by Krishnakanth V. Sistla, et al., filed Dec. 15, 2011.

Klaiber, A., "The Technology Behind Crusoe Processors," Jan. 2000, 18 pages.

J.C. Dehnert, et al., "The Transmeta Code Morphing Software: Using Speculation, Recovery, and Adaptive Retranslation to Address Real-Life Challenges," 2003, 10 pages.

H. Homayoun, et al., "Analysis of Functional Unit Power Gating in Embedded Processors," Oct. 2005, 6 pages.

D. Ditzel, "Transmeta's Second Generation Efficeon Microprocessor and Technology Roadmap," Oct. 5, 2004, 28 pages.

\* cited by examiner

POWER GATING FUNCTIONAL UNITS OF A PROCESSOR

This application is a continuation of U.S. patent application Ser. No. 13/528,548, filed Jun. 20, 2012, the content of which is hereby incorporated by reference.

TECHNICAL FIELD

Embodiments relate to processors and more particularly to power efficient operation of a processor.

BACKGROUND

In a hardware/software co-design processor, a compiler optimizes binary codes for a target processor with runtime profiling information, and the target processor, such as a very large instruction word (VLIW) processor, executes the optimized codes in an efficient way.

It is known that many programs use only some functional units of a processor, and leave other units idle for a long time. The idle units still consume power due to leakage current although the units are not used. In addition, as semiconductor technology scales down, leakage power takes an increasingly large portion of total power dissipation. Currently, there are not effective techniques to reduce the power consumption, especially from the leakage power, when functional units are not being used.

DETAILED DESCRIPTION

Embodiments may provide power gating of unused functional units of a processor. In some embodiments the processor may provide software/hardware co-designed power gating to reduce leakage power consumption in functional units of a processor or other semiconductor device. To this end, idle functional units can be identified, and power is not distributed to the idle functional units in a software/hardware co-designed way. Since a compiler has a much larger instruction window than hardware, the software/hardware co-design can support power-gating more efficiently than hardware only systems. Moreover, the compiler can optimize programs in power efficient ways.

Embodiments may thus reduce power gating overhead. This is so, as conventionally power gating has been conservatively adopted due to large performance and power overheads. To reduce power gating overheads, embodiments may morph a program to keep using a functional unit or not using it continuously, via a scheduling technique and a special power mode. Embodiments may also provide hardware components to support a compiler's power management and handle exceptional cases.

When the compiler interprets and translates codes, it analyzes functional unit usage, actively morphs the codes to increase the power saving opportunity, and passes the information to hardware. The hardware controls power distribution and turns off the non-used functional units. It also may handle exceptional cases with an exception handler and a dynamic scheduler.

Figure 1:
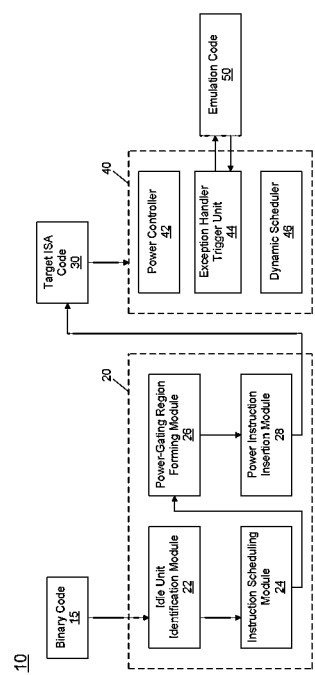
FIG. 1 is a block diagram of a hardware/software co-designed processor in accordance with an embodiment of the present invention.

Referring now to FIG. 1, shown is a block diagram of a hardware/software co-designed processor in accordance with an embodiment of the present invention. As shown in FIG. 1, processor 10 can include hardware components and software that executes on these components. Details of a particular co-design processor will be described below. However, for purposes of illustrating hardware/software co-designed power management in accordance with an embodiment of the present invention, certain high level components of both the software and hardware are described in FIG. 1. Also understand that the scope of the present invention is not limited to a hardware/software co-design and can be used in other processor architectures.

As seen in FIG. 1, processor 10 includes software components 20 and hardware components 40. These components interact to generate codes for execution on the hardware that are power optimized. This generation of codes can take original source code and transform it into power optimized code to enable operation of the processor at reduced power consumption levels.

As seen, incoming source code 15 may be binary code of a given application. This code is provided to software components 20 which may generally correspond to a compiler such as a dynamic binary translator (DBT) mechanism. In general, compiler 20 generates native code, which may be of a different, target instruction set architecture (ISA) than the originally received source code 15, for execution on the hardware components 40.

In the embodiment shown in FIG. 1, compiler 20 includes an idle unit identification module 22, an instruction scheduling module 24, a power gating region forming module 26, and a power instruction insertion module 28. In general, these modules interact to receive the incoming source code, identify idle functional units of the processor when this code is executed, and modify scheduling of instructions from the original source code to a modified arrangement to take advantage of the idle information. Then based on this information and scheduling, various power gating regions of code can be formed and within each such region, one or more power instructions may be inserted to provide instructions to the hardware to appropriately enable and/or disable given units based on their usage within the code.

Accordingly, compiler 20 generates target code 30 which may correspond to microcode instructions of the target ISA. In turn, these target instructions are provided to hardware components 40. Understand that a processor can include multiple cores and other logic in addition to the components shown in FIG. 1. FIG. 1 shows hardware including a power controller 42, an exception handler trigger unit 44, and a dynamic scheduler 46, in implementations of an out-of-order processor. In general, power controller 42 may cause various cores or portions thereof to be enabled or disabled based on the power instructions within the target code. In turn, exception handler trigger unit 44 may trigger an exception to an exception handler to handle exceptions raised when one or more instructions of the target code seeks to use a given functional unit that is in a powered down mode. Specifically, the identified exception handler may emulate execution of such instructions via emulation code 50, which may be stored in an emulation database. Also seen in FIG. 1 is a dynamic scheduler 46 which can be used to dynamically schedule the instructions in a power-aware manner. For example, the scheduler can choose to provide instructions for execution on an enabled functional unit by use of exception handler 44 when a target functional unit for the instructions is powered off. Although shown at this high level in the embodiment of FIG. 1, understand the scope of the present invention is not limited in this regard.

Figure 2:
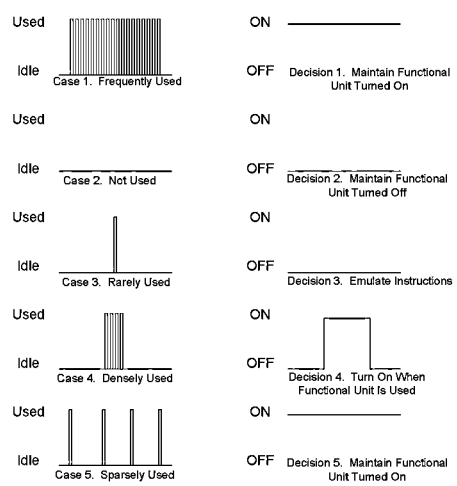
FIG. 2 is a graphical illustration of different cases of functional unit usages, and their corresponding power gating decisions in accordance with one embodiment of the present invention.

FIG. 2 is a graphical illustration of different cases of functional unit usages, and their corresponding power gating decisions. As seen, if a functional unit is frequently used or never used (Cases 1 and 2, respectively), the compiler may cause the functional unit to be turned on or off (Decisions 1 and 2, respectively). If the functional unit is used only at rarely occurring events (Case 3), the compiler may allow the runtime software to emulate the unit while keeping the functional unit turned off (Decision 3). When a functional unit is used only for a small fraction of time, power consumption may or may not be saved depending on the usage patterns. If a functional unit is densely used in a short time (Case 4), the hardware can turn off the functional unit after the usage (Decision 4). However, if the functional unit is sparsely used (Case 5), the hardware cannot gate the functional unit timely due to power-gating overhead. As such, in an embodiment the functional unit may be kept turned on (Decision 5).

To maximize power efficiency, the compiler sometimes can schedule instructions to make the functional unit densely used, and turn off the unit continuously after the usage, thus converting a Case 5 to a Case 4 situation. More specifically, this scheduling may operate to modify an original scheduling to thus co-locate instructions that use the functional unit within a local code region such that the functional unit can be enabled during this local code region to execute those instructions, and then to be powered down after execution of this local code region.

In various embodiments, a compiler can determine if a functional unit is used or not by analyzing instructions in a program. For example, a dynamic compiler can identify floating point unit usage during interpreting and translating binary codes. After the usage is determined for a given instruction window, the compiler may categorize the usage patterns into one of the above scenarios (or any other combination of scenarios). To this end, the compiler may have a set of one or more predetermined threshold ratios and a large instruction window to determine the usage pattern. If a functional unit is not used at all in the instruction window, the window is categorized as a not used case (Case 2). If the functional unit is used less than a threshold level, it is categorized as a rarely used case (Case 3). For the other cases, the compiler may determine distances between the usages. If the first and last usages of a given functional unit are located within a predetermined distance, the usage can be categorized as a densely used case (Case 4). If multiple usages are repeated within a large distance, it is categorized as a sparsely used case (Case 5). Note that window size and threshold distances can vary in different embodiments. In general, the threshold distance can be determined with reference to power-gating overhead. The threshold is a break-even point between power-gating overhead and saved power for the threshold distance. Other cases may be categorized as a frequently used case (Case 1).

If a functional unit is sparsely and repeatedly used (Case 5), for example once per iteration in a loop, it can be difficult to generate power-efficient codes. Turning on and off the functional unit increases power and performance overhead due to frequent power switching. To resolve this issue, the compiler can optimize the codes in a power-efficient manner by gathering the instructions and executing them together as in a Case 4 situation. For example, a loop splitting transformation may partition a loop into multiple loops, allowing the functional unit to be densely used during a short period. As an example, a compiler can split one loop into multiple loops, and put all the instructions that use the functional unit into one loop or several loops depending on the loop structure. For example, the following loop (Loop) can be transformed into two loops (Loop1 and Loop2) as follows:

Loop:
instruction A;
instruction B (uses functional unit);
instruction C;
instruction D (uses functional unit; and generates a result E);
instruction F (reads E).
Loop1:
instruction B (uses functional unit);
instruction D (uses functional unit, and generates a result E);
enqueue E.
Loop 2:
instruction A;
instruction C;
dequeue E;
instruction F (reads E).

For another example, instruction scheduling may move floating point instructions spread in far apart blocks into one block, so that the compiler can turn the functional unit off after the block.

Once the identification and scheduling are done, the translated code can be partitioned into power-gating regions (or PRs). If a large instruction window is only one of Cases 1, 2, 3, and 5, which can be formed of one or multiple translation units, becomes one PR. If the instruction window is instead a Case 4 scenario, it may be partitioned into multiple power gating regions such that a functional unit can be turned on only when it is used. If an instruction window includes code regions belonging to multiple scenarios, it can be partitioned into multiple power gating regions.

In the PRs, each functional unit can be set to one of three power modes: ON, OFF, STAY. Once power-gating regions are formed, the compiler may insert one or more instructions regarding the functional unit usage, e.g., at the beginning of each power region to identify a selected one of these modes.

Figure 3:
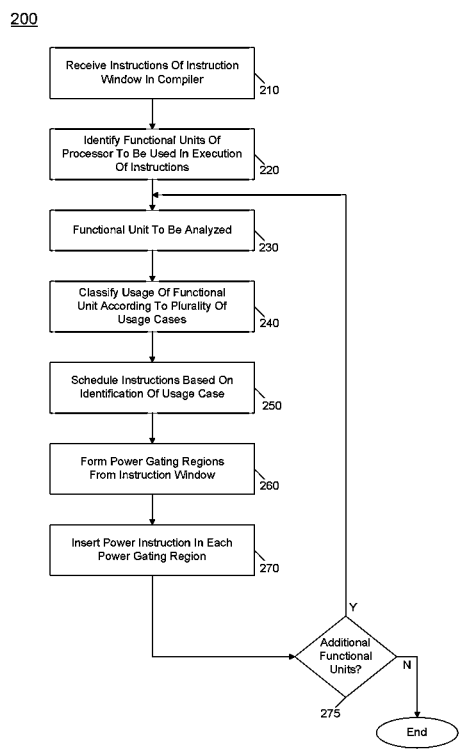
FIG. 3 is a flow diagram of a method for performing generation of power efficient code in accordance with an embodiment of the present invention.

Referring now to FIG. 3, shown is a flow diagram of a method for performing generation of power efficient code in accordance with an embodiment of the present invention. In an embodiment, method 200 can be performed by a compiler such as a DBT. As seen, method 200 can begin by receiving instructions of an instruction window in the compiler (block 210). Note that the instruction window can be of a relatively large size, e.g., on the order of between approximately 100s of instruction and an entire program's instructions. Control next passes to block 220 where the functional units of the processor to be used in execution of the instructions can be identified. Note that in some cases, rather than identifying all such functional units, only one or selected functional units can be identified, namely such functional units as may be of relatively high power consumption and of possibly less overall use in instruction execution. For example, in one embodiment a vector processing unit (VPU) that performs vector instructions on vector-sized data can be of relatively high power consumption and may not be used during execution of non-vector instructions. However, for purposes of discussion it can be assumed that multiple functional units can be subject to power gating. Accordingly, a loop begins at block 230 for each such functional unit to be analyzed.

In this loop at block 240 the usage case of the functional unit according to a classification scheme can be determined. For example, in an embodiment a plurality of usage cases can be pre-identified and analysis of a functional unit with regard to this instruction window can be identified as being of one of these multiple usage cases, such as the example usage cases described above in FIG. 2. Next at block 250 the instructions can be scheduled based on this identification to modify an original schedule of the instruction window to a modified schedule to enable more efficient power consumption, if possible. That is, scheduling in accordance with an embodiment of the present invention may change an identified usage case to a more favorable one, for example, changing a Case 5 situation to a Case 4. Next, depending on the type of usage case identified, one or more power gating regions can be formed from the instruction window (block 260).

Then at block 270 a power instruction can be inserted into each of these power gating regions. Details of the power gating instruction are described further below. However, for introduction purposes, this instruction can include a power identification field to identify a power state of the corresponding functional unit for the power gating region. In an embodiment, three such states may be provided, namely ON, OFF and STAY modes as discussed further below. To enable control of the functional unit accordingly, this power instruction can be inserted at a beginning of the power gating region in an embodiment. In other embodiments it may be possible to provide a power instruction for a succeeding region at or near the end of a previous power gating region to thus enable a powered down functional unit to be powered up in a timely manner. Next at diamond 275 it can be determined whether additional functional units are to be analyzed. If so, the loop may again be performed. Otherwise, the method may conclude.

Figure 4:
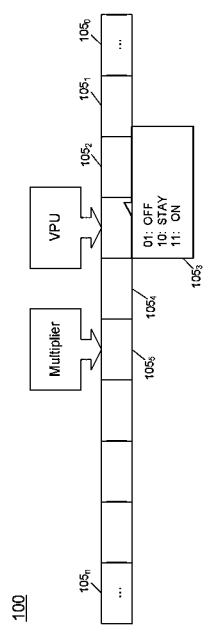
FIG. 4 is a graphical illustration of a power instruction in accordance with an embodiment of the present invention.

Referring now to FIG. 4, shown is a graphical illustration of a power instruction in accordance with an embodiment of the present invention. As shown in FIG. 4, power instruction 100 includes a plurality of power identification fields $105_0$-$105_n$. In addition to these fields, other instruction coding information such as an opcode and so forth may be present. Each such field may be associated with a given functional unit (or portion thereof) of a processor core. In the illustration of FIG. 4, two specific such units having a corresponding power identification field include a VPU (corresponding to power identification field $105_3$) and a multiplier unit (corresponding to power identification field $105_5$). In the embodiment of FIG. 4 power instruction 100 includes a power identification field of two bits per functional unit to enable three modes: ON/OFF/STAY. If a PR frequently uses a functional unit (as in Cases 1, 4, 5), the compiler sets the field as ON to enable the functional unit to be turned on. If the PR does not use a functional unit (Cases 2, 4), the compiler sets the field as OFF, so the hardware can turn off the functional unit. The STAY mode is used when a functional unit is rarely used in a PR (e.g., a Case 3 scenario).

Figure 5:
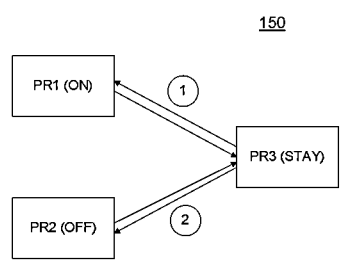
FIG. 5 is a block diagram of possible execution paths of a code region including a plurality of power regions that illustrates how the STAY mode operates in accordance with one embodiment of the present invention.

FIG. 5 is a block diagram of possible execution paths of a code region 150 including a plurality of power regions that illustrates how the STAY mode operates. While PR1 uses a functional unit substantially keeping it turned on, PR2 gates off the functional unit. PR3 can be executed after either PR1 or PR2, and uses the functional unit once. If PR3 is executed after PR1 as in Flow 1, it would be better to keep the functional unit turned on because it is faster and efficient. However, if PR3 is executed after PR2 as in Flow 2, it would be beneficial to emulate the functional unit because there is power and performance overhead to turn on the functional unit. To support both cases, the compiler can set the power identification field for the corresponding functional unit as STAY to keep the power state unchanged to either allow the code to operate on its intended functional unit, or to trigger an exception handler to execute emulation code to enable execution on a functional unit that does not support the code (or at least one instruction of the code).

In various embodiments, a power controller can be controlled responsive to a decoded power instruction, and determine whether to turn off a functional unit or not. If the corresponding power identification field is set to OFF, it turns off the corresponding functional unit, and enters the power saving mode for the functional unit. If the field is set to STAY, the power controller keeps the current mode. The hardware processor then may use the functional unit in the normal mode, or execute the runtime emulation codes in the power saving mode. If the field is set to ON, the controller turns the functional unit on, and the processor returns to the normal mode.

Note that if a PR is set as STAY mode, and its relevant functional unit is turned off, the runtime handles the usage as an exception case, which can be handled via an exception handler. The runtime checks which functional unit is called, reads emulation codes (which may be store in a microcode storage or other memory), and emulates the functional unit.

If a PR is set as ON mode, and its functional unit is turned off, the power controller may turn on the functional unit. Since there is a time delay or latency in turning on a functional unit, early information regarding when a functional unit will be used can aid in efficient operation. Although in an embodiment the compiler locates the information at the beginning of the power region (as a power instruction), the hardware may consume extra time to fully power on the functional unit. In this case, the software may schedule functional unit operations after the operation that turns on the unit, and find independent instructions to overlap this on-time delay. Also, if the hardware supports out-of-order execution, a dynamic scheduler can be used to delay the functional unit operations and execute independent instructions first. If additional time is still needed, the hardware may enable the exception handler to emulate the functional unit while the unit is turned on.

Figure 6:
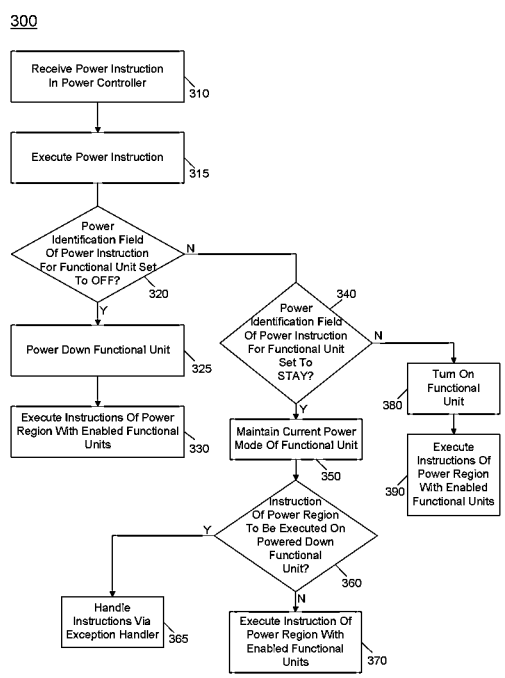
FIG. 6 is a flow diagram of a method of executing power-optimized code in accordance with an embodiment of the present invention.

Referring now to FIG. 6, shown is a flow diagram of a method of executing power-optimized code in accordance with an embodiment of the present invention. As shown in FIG. 6, method 300 can be performed by various hardware components of a processor, including a power controller, an instruction decoder, and one or more functional units that execute the instructions of the code.

As seen, method 300 may begin by receiving a power instruction in a power controller (block 310). As discussed above, this power instruction can include one or more power identification fields to identify an appropriate power state for a given functional unit during execution of instructions of a power gating region. Next at block 315 this power instruction can be executed in the power controller. Then at diamond 320 it can be determined whether the power identification field of the power instruction for a given functional unit is set to OFF. If so, control passes to block 325 where the given functional unit can be powered down, if it was not already in a low power state. Control next passes to block 330 where the instructions of the functional unit can be executed with one or more enabled functional units. Such instruction execution can occur conventionally by decoding the instructions and executing them in the one or more functional units.

Still referring to FIG. 6, if instead at diamond 320 it is determined that the power identification field does not indicate that the given functional unit is set to OFF, control passes to diamond 340 where it can be determined whether this indicator is set to a STAY mode. If so, control passes to block 350 where the current power mode of the functional unit is maintained. This is so, as with the STAY mode, a given functional unit remains in the same state it was prior to entering of the power region. Control then passes to diamond 360, where it can be determined whether an instruction of the power region is to be executed on a powered down functional unit. If a given one or more instructions are to be executed on a powered down functional unit, control passes to block 365 where such instructions can be handled via an exception handler which may operate to run exception code to emulate the powered down functional unit. If a given one or more instructions are to be executed on a powered on functional unit, control next passes to block 370 where the instructions of the functional unit can be executed with the enabled functional units.

Referring still to FIG. 6, if instead it is determined that at diamond 340 the power identification field is not set to the STAY mode, then the power instruction indicates that the functional unit is to be powered on. Accordingly if not already enabled, at block 380 the functional unit can be turned on and then at block 390 instructions of the power region can be executed with the enabled functional units. Although shown at this high level in the embodiment of FIG. 6, understand the scope of the present invention is not limited in this regard.

Figure 7:
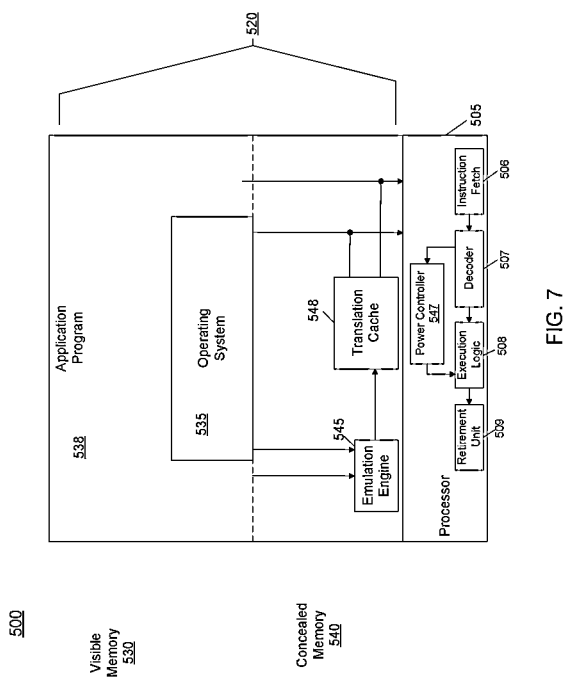
FIG. 7 is a block diagram of a co-design environment including a processor and a memory according to one embodiment.

Referring now to FIG. 7, a co-design environment 500 includes a processor 505 and a memory 520 which in one embodiment may be a system memory such as a dynamic random access memory (DRAM). As seen, processor 505 may have a given micro-architecture and may be coupled to memory 520 by way of, e.g., a point-to-point interconnect, bus or other such manner. As seen, processor 505 which may be a co-design processor, includes front end units such as an instruction fetcher 506 that can receive instructions directly from the OS or application programs. These instructions, which may be macro-instructions, e.g., corresponding to user-level instructions of an application program can be decoded using a decoder 507, which may operate to decode the instruction and access corresponding μops, e.g., present in a microcode storage of processor 505. In turn, decoder 507 may provide the μops to execution logic 508, which may include various arithmetic logic units (ALUs), such as at least one scalar unit to execute instructions of a target ISA and at least one vector unit (e.g., a VPU) to execute vector instructions of the target ISA, specialized hardware and other types of computation units. Results from these instructions may be provided to a retirement unit 509, which operates to retire the instructions to thus store the results to an architectural state of the processor in program order, if no fault or exceptions occurred. While described as an in-order machine, embodiments can equally be implemented using an out-of-order machine.

In a visible portion of memory 520, namely a first portion 530, one or more operating systems 535 and application programs 538 may be stored. This portion is termed "visible" as it can be visible to user-level code (i.e., the application program 538) and visible to the OS (both OS 535 and program 538). Depending on the type of instructions to be executed in these programs, communication may be directly with processor 505, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 540, in order to provide translated code to processor 550. Specifically, as seen, both OS 535 and application program 538 may communicate with an emulation engine 545, which may include a runtime execution unit including interpretation, translation and optimization mechanisms, and may include a dynamic scheduler in accordance with one embodiment of the present invention. Note that concealed memory 540 is not visible or accessible to the OS or application programs. Emulation engine 545 may thus provide code and address information to a translation cache 548, which may include translated code that can be provided to processor 505 for execution. In one embodiment, code stored in translation cache 548 may be encrypted. This translated code may be written and optimized for the underlying micro-architecture of the processor, e.g., target ISA code.

As further seen in FIG. 7, a power controller 547 may also be present. As seen, certain decoded instructions, namely one or more power instructions of each power region may be received in power controller 547. Based on these instructions, power controller 547 may determine what execution units are to be enabled during execution of the instructions of the given power region, control functional unit emulation or dynamically delay the instruction while the functional unit is turned on. In other embodiments, a compiler can directly insert emulation code instead of the instruction, or the processor hardware can wait for the functional unit to be turned on before executing the instruction.

Thus responsive to code directly provided from visible code from visible memory 530 or translated instructions from translation cache 548, the hardware elements of processor 500 can execute the instructions with the enabled execution units, based on their control responsive to the various fields of power instructions received in power controller 547. Note that while not shown for ease of illustration in the embodiment of FIG. 7, understand that one or more local power gate circuits may be provided and can be used to power gate a given execution or functional unit when it is not to be powered on for a given power region. In other embodiments, rather than performing power gating, a clock gating of the non-enabled units may occur. Furthermore, while shown at this high level in the embodiment of FIG. 7, understand the scope of the present invention is not limited in this regard.

Figure 8:
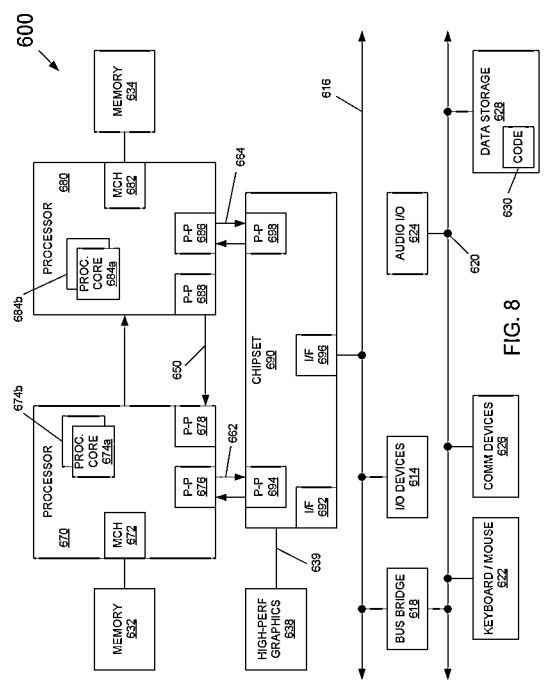
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a power controller, a compiler, a dynamic scheduler, and other logic to dynamically control power to execution units of the processor, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may exploit software to make more correct power-gating decisions with lower overhead. That is, embodiments do not rely only on past execution in making a gating decision. In addition, an instruction window in accordance with an embodiment of the present invention may be much larger than a hardware instruction window such that sparse operations can be covered to avoid repeated switching overhead. Since a compiler in accordance with an embodiment of the present invention detects idle functional units, the gating decision reflects the future usage correctly, and sparse operations can be covered due to its large software instruction window. Moreover, since the functional unit usage is identified by the compiler, it avoids the repeated power overhead incurred by detection hardware.

Still further, embodiments enable the compiler to manipulate codes in favor of power savings. That is, embodiments change the original codes, and further can analyze data dependence and optimize the codes as a power efficient way to maximize power saving. Further by providing a STAY mode, the hardware can avoid turning on the gated unit if the functional unit is rarely used. Instead, the runtime emulates the execution. Further while turning on the gated units, software scheduling and hardware may delay the functional unit usage, and emulate the functional units to overlap the switching overhead. As such the compiler can detect and gate functional units. To maximize power saving, the compiler may analyze the functional unit usage patterns, and reschedule instructions with data dependence analysis, enabling finding of hidden power-saving opportunities.

Embodiments may thus use a dynamic binary translator to generate optimized code running with atomic regions, and save power consumption of the processor by allowing a functional unit to be completely turned off with low recovery overhead.

The following clauses/examples pertain to further embodiments.

An apparatus may comprise a core including a plurality of functional units each to execute instructions of a target instruction set architecture (ISA) and a power controller to control a power mode of a first functional unit of the plurality of functional units responsive to a power identification field of a power instruction of a power region of a code block to be executed on the core. The power instruction can include a plurality of power identification fields each to indicate a power mode for a corresponding one of the plurality of functional units. The power identification field may be of a first state to indicate that the first functional unit is to be powered on, of a second state to indicate that the first functional unit is to be powered off, and of a third state to indicate that the first functional unit is to remain in a current power mode. A translation unit can receive a source code block of a source ISA and translate the source code block into the code block. The translation unit can modify the source code block to co-locate a plurality of instructions that use the first functional unit in a first power region and exclude instructions that use the first functional unit from a second power region. The translation unit can insert in the first power region a power instruction including a power identification field to indicate that the first functional unit is to be powered on during the first power region and to insert in the second power region a second power instruction including a power instruction field to indicate that the first functional unit is to be powered off during the second power region. The translation unit can determine to enable the first functional unit during an instruction window if the first functional unit is to be used for more than a threshold number of instructions of the instruction window and disable the first functional unit during the instruction window if the first functional unit is to be used for less than the threshold number of instructions of the instruction window. The translation unit can modify the source code block by movement of a first instruction that uses the first functional unit to be within a power region with a plurality of other instructions that use the first functional unit if the first instruction is more than a threshold distance from one of the plurality of other instructions. The translation unit may partition a first loop into a plurality of loops, when instructions of the first loop that are to execute on the first functional unit are co-located in a single one of the plurality of loops. The translation unit may enable the first functional unit during execution of the single one of the plurality of loops and disable the first functional unit during execution of others of the plurality of loops.

A method includes identifying a first functional unit of a processor to be used in execution of instructions of an instruction window, classifying usage of the first functional unit according to a plurality of usage cases to identify a usage case of the first functional unit for the instruction window, and scheduling instructions of the instruction window for execution on the processor to modify the usage case from a first usage case to a second usage case to enable the first functional unit to be placed in a low power state for at least a portion of the instruction window. The method may further include forming at least one power gating region from the instruction window to obtain a modified code block, the modified code block being of a different ISA than an ISA of the instruction window and having a different scheduling than the instruction window, and inserting at least one power instruction in each of the at least one power gating region. The method may further include storing the modified code block in a translation storage coupled to the processor. The method may further include executing a first power gating region of the modified code block including a first power instruction and controlling the first functional unit of the processor to be in an active or inactive power state responsive to a power identification field of the first power instruction corresponding to the first functional unit.

A system may include a processor including a first unit to execute instructions of a target ISA, a vector unit to execute vector instructions of the target ISA, and a dynamic scheduler to schedule instructions of the target ISA for execution on one of the first unit and the vector unit, where the dynamic scheduler is to schedule a vector instruction of a code region on the first unit responsive to a power instruction of the code region having a power identification field to indicate that the dynamic scheduler is to maintain a current power mode of the vector unit, and a dynamic random access memory (DRAM) coupled to the processor. The dynamic scheduler can schedule a second vector instruction of a second code region on the vector unit responsive to a power instruction of the second code region having a power identification field to indicate that the vector unit is to be powered on during the second code region. The dynamic scheduler can schedule a third vector instruction to the first unit if the vector unit is powered down during a prior code region, and otherwise schedule the third vector instruction to the vector unit. The dynamic scheduler may call an exception handler to execute emulation code to perform the third vector instruction on the first unit if the vector unit is powered down during the prior code region.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core including a decoder to decode instructions and provide the decoded instructions to an execution logic having at least one scalar unit and at least one vector unit to execute instructions of a target instruction set architecture (ISA);
   a power controller to control a power mode of the at least one vector unit responsive to a power identification field included in a power instruction of a power region of a code block; and
   a translation unit to receive a source code block of a source ISA and to translate the source code block into the code block, wherein the translation unit is to determine to enable the at least one vector unit during an instruction window if the at least one vector unit is to be used for more than a threshold number of instructions of the instruction window.

2. The processor of claim 1, wherein the power instruction includes a plurality of power identification fields each to indicate a power mode for one of the at least one scalar unit and the at least one vector unit.

3. The processor of claim 1, wherein the power identification field is of a first state to indicate that the at least one vector unit is to be powered on, of a second state to indicate that the at least one vector unit is to be powered off, and of a third state to indicate that the at least one vector unit is to remain in a current power mode.

4. The processor of claim 1, wherein the translation unit is to modify the source code block to co-locate a plurality of instructions that use the at least one vector unit in a first power region and to exclude instructions that use the at least one vector unit from a second power region.

5. The processor of claim 4, wherein the translation unit is to insert in the first power region a power instruction including a power identification field to indicate that the at least one vector unit is to be powered on during the first power region and to insert in the second power region a second power instruction including a power instruction field to indicate that the at least one vector unit is to be powered off during the second power region.

6. The processor of claim 1, wherein the translation unit is to determine to disable the at least one vector unit during the instruction window if the at least one vector unit is to be used for less than the threshold number of instructions of the instruction window.

7. The processor of claim 1, wherein the translation unit is to modify the source code block by movement of a first instruction that uses the at least one vector unit to be within a power region with a plurality of other instructions that use the at least one vector unit if the first instruction is more than a threshold distance from one of the plurality of other instructions.

8. The processor of claim 1, wherein the translation unit is to partition a first loop into a plurality of loops, when instructions of the first loop that are to execute on the at least one vector unit are co-located in a single one of the plurality of loops.

9. The processor of claim 1, wherein the power controller is to execute the power instruction, the power instruction inserted into the code block by a compiler.

10. A non-transitory machine-readable medium having stored thereon instructions, which if performed by a machine cause the machine to perform a method comprising:
    identifying a first functional unit of a processor to be used in execution of instructions of an instruction window;

classifying usage of the first functional unit to identify a usage case of the first functional unit for the instruction window;

scheduling instructions of the instruction window for execution on the processor to modify the usage case from a first usage case to a second usage case to enable the first functional unit to be placed in a low power state for at least a portion of the instruction window;

forming at least one power gating region from the instruction window to obtain a modified code block, the modified code block being of a different instruction set architecture (ISA) than an ISA of the instruction window and having a different scheduling than the instruction window; and inserting at least one power instruction in the modified code block.

11. The non-transitory machine-readable medium of claim 10, wherein the method further comprises storing the modified code block in a translation storage coupled to the processor.

12. The non-transitory machine-readable medium of claim 11, wherein the method further comprises:

executing a first power gating region of the modified code block including a first power instruction; and controlling the first functional unit of the processor to be in an active power state responsive to a power identification field of the first power instruction corresponding to the first functional unit.

13. A system comprising:

a processor including a first functional unit and a second functional unit to execute instructions of a target instruction architecture (ISA), and a dynamic scheduler to schedule instructions of the target ISA for execution on one of the first and second functional units, wherein the dynamic scheduler is to schedule a first instruction of a code region on the first functional unit responsive to a power instruction of the code region having a power identification field to indicate that the dynamic scheduler is to maintain a current power mode of the second functional unit, wherein the first functional unit is to emulate the first instruction; and a dynamic random access memory (DRAM) coupled to the processor.

14. The system of claim 13, wherein the dynamic scheduler is to schedule a second instruction of a second code region on the second functional unit responsive to a power instruction of the second code region having a power identification field to indicate that the second functional unit is to be powered on during the second code region.

15. The system of claim 13, wherein the dynamic scheduler is to schedule a third instruction to the first functional unit if the second functional unit is powered down during a prior code region, and otherwise to schedule the third instruction to the second functional unit.

16. The system of claim 15, wherein the dynamic scheduler is to call an exception handler to execute emulation code to perform the third instruction on the first functional unit if the second functional unit is powered down during the prior code region.

17. The system of claim 13, wherein the code region is to be generated by a compiler to receive a binary code block and generate a plurality of code regions including the code region.

* * * * *